March 14, 1961

M. AMSLER

RECORDING APPARATUS PROVIDED WITH AUTOMATIC CANCELLATION 2,975,016

Filed Dec. 3, 1958

5 Sheets-Sheet 3

March 14, 1961

M. AMSLER

RECORDING APPARATUS PROVIDED WITH AUTOMATIC CANCELLATION 2,975,016

Filed Dec. 3, 1958

5 Sheets-Sheet 5

2,975,016

RECORDING APPARATUS PROVIDED WITH AUTOMATIC CANCELLATION

Max Amsler, Sandrainstrasse 3, Biel 7, Switzerland

Filed Dec. 3, 1958, Ser. No. 777,879
Claims priority, application Switzerland Dec. 10, 1957
17 Claims. (Cl. 346—18)

This invention relates to a recording apparatus provided with automatic cancellation.

It is known to use tachographs in train locomotives and heavy motor vehicles for graphically recording the speed of travel of the vehicle. Only the information for the last 300 to 500 meters is recorded, and subsequently, the information is cancelled. The prior art devices require regular maintenance and are not suitable or adaptable for private motor vehicles, since if such devices are used in private motor vehicles, the maintenance problem would far outweigh the benefits to be obtained.

It is therefore an object of this invention to provide a recording device suitable for use in private motor vehicles and which would meet the requirements of minimum maintenance and a low initial cost.

A further object of the present invention is the provision of a registering device with automatic extinction. One of the essential features of the invention is the provision of a rotating part which on its rim is provided with a number of flexible tongues, and a stationary part with a rib extending along the free tongue tips, which has an interruption, and by a part placed and steered within this interruption. This organ is flexible between two end positions and bends the tongues, which pass the interruption point, thus forcing the bent tongues to glide over the rib until they reach again the interruption point. On the other hand, the same organ does not bend the moving tongues as long as it is in the other end position, thus allowing the tongues to move along beneath the rib.

Yet another object of the present invention is the provision of an improved recording device of the above character which is of simple design and construction, economical to manufacture, and highly efficient in the accomplishment of its intended purpose.

A still further object of the present invention is the provision of a recording instrument with automatic cancellation of the recorded information which generally comprises a plurality of resiliently flexible tongues suitable for engagement with a stationary member which is effective for bending the tongues in accordance with information which is to be recorded and for allowing others of the tongues to remain in an unbent condition, the condition of said tongues being changed in accordance with the last condition of the vehicle to be indicated, such as the condition for the last 300 to 500 meters.

Yet a further object of the present invention is the provision of a device which can be easily installed into a motor vehicle and which will assist the police authority or other legal authorities to ascertain the driver's actions and reactions during the last 300 to 500 meters of travel of the vehicle.

In order that the invention may be clearly understood and readily carried into effect, it will now be described more fully with reference to the accompanying drawings, in which.

Figures 1, 6:
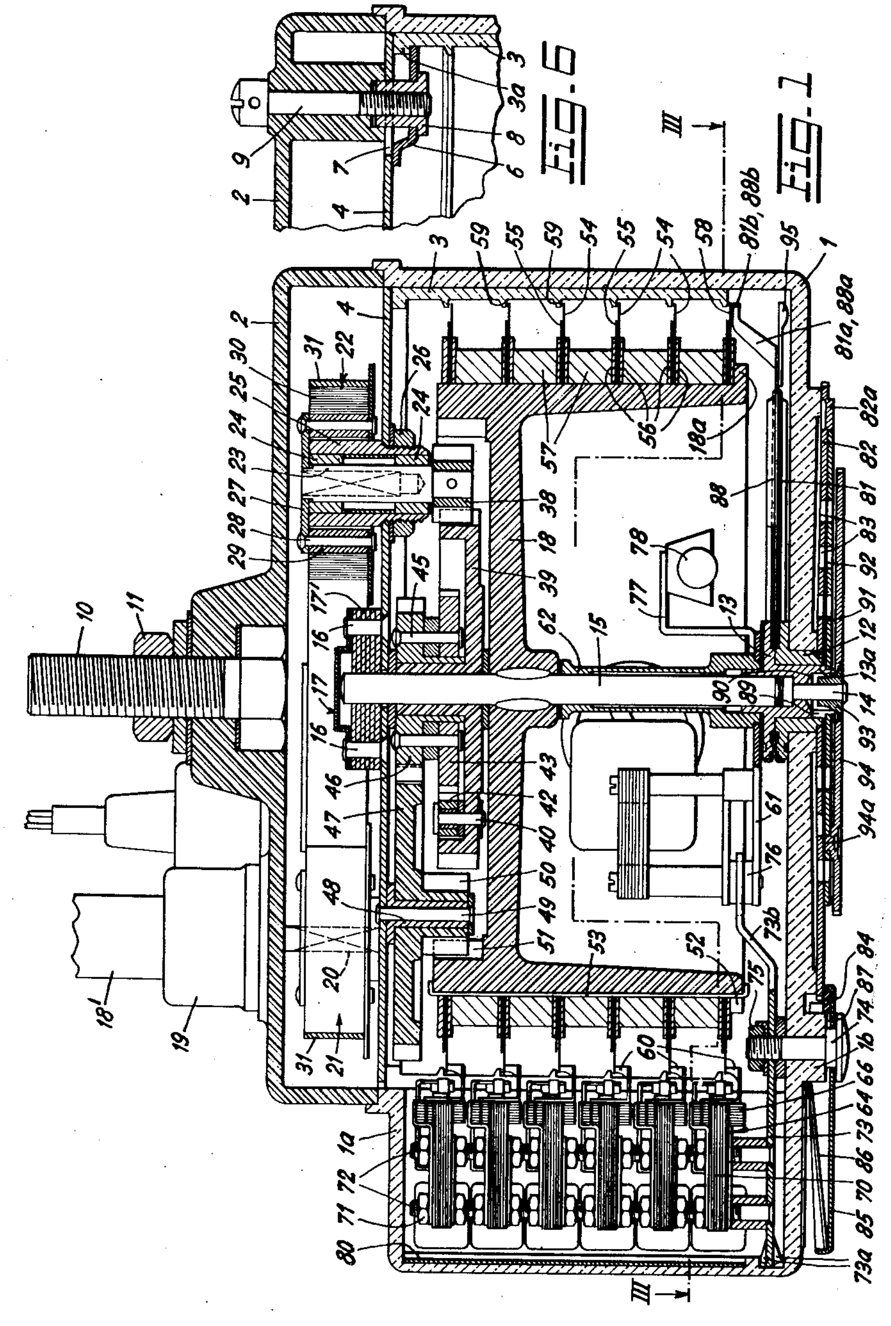
Figure 1 illustrates a longitudinal section of the apparatus taken along line I—I of Figure 2; a gear shown in the lower portion of Figure 2 is supposed to be located in the section plane of Figure 1 for illustration purposes.
Figure 6 is a partial sectional view taken on line VI—VI of Figure 2.

Referring now to the drawings there is provided a clear, transparent case 1 made of scratchproof plastic material and a cover or lid 2 made from a colored plastic material. Disposed within case 1 is a hollow cylindrical segment 3 constructed of the same material as case 1; pins, which are not shown, may be used to affix the segment 3 to case 1 and are advantageously made from the same material as case 1.

Figure 2:
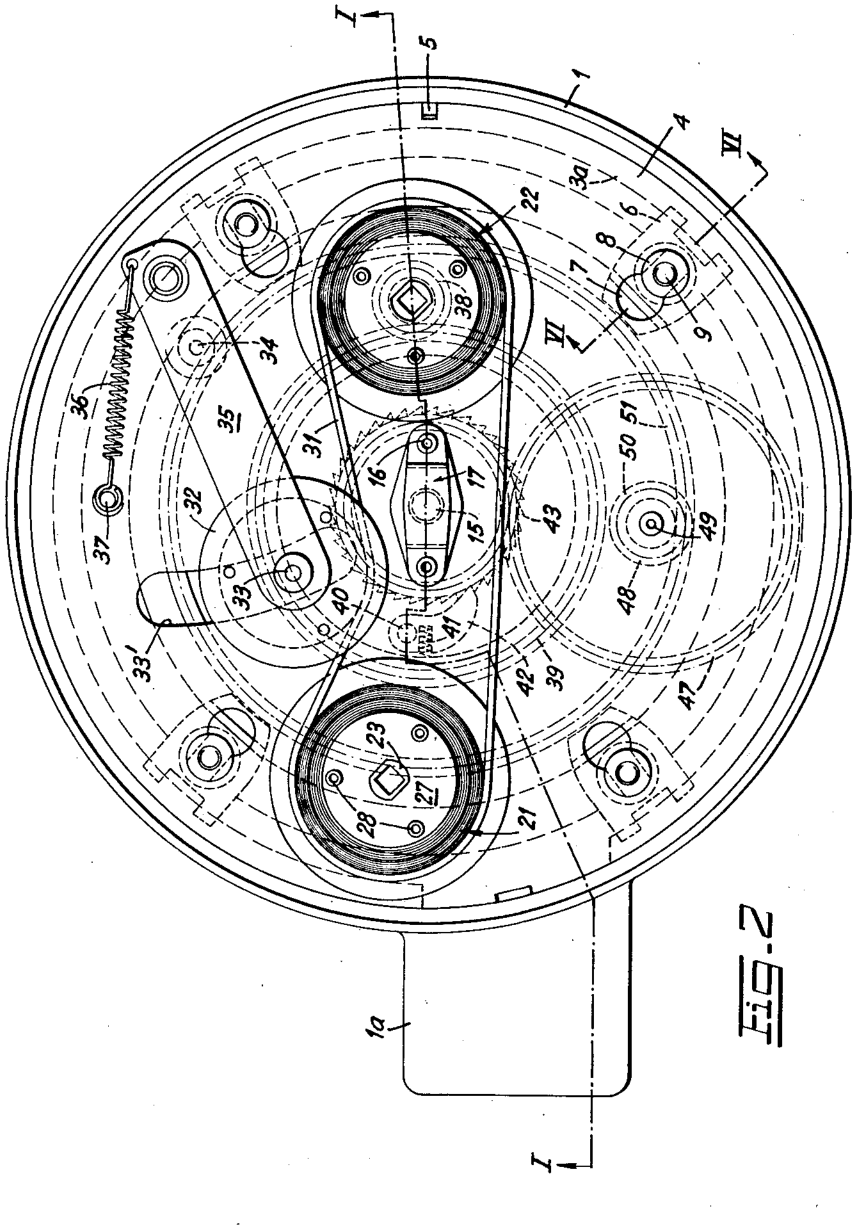
Figure 2 is a top plan view of the apparatus as shown in Figure 1 with the cover removed.

Disposed upon cylindrical segment 3 is a base plate 4 which is centrally located relative to the upper outer edges of case 1. Segment 3 is also provided with a finger 5 (see Figure 2) which protrudes into a notch provided in base plate 4, to ascertain that the base plate 4 takes the correct angular position with regard to the case 1 which has a lateral extension 1*a*. In order to clamp lid 2 to the base plate 4, four clamping devices are provided (see Figure 6). Each clamping device comprises a small elastic supporting plate 6 which abuts at one end thereof against a lip portion 3*a* provided on the inner circumference of segment 3 at the top thereof and the plate 6 abuts at the other end thereof against base plate 4. Each clamping device is provided with a nut 8 which fits within an opening in the elastic supporting plate 6 and through an aperture 7 in base plate 4 aligned with the opening in plate 6. Screw 9 fits within an opening in lid 2 and is guided by a bushing which projects from lid 2 for engagement with nut 8; aperture 7 as will be seen from Fig. 2 is provided with an enlarged portion through which nut 8 may be removed and is also provided with a narrowed portion having two opposing flat surfaces for engagement with the sides of nut 8 to prevent rotation thereof relative to base plate 4 and screw 9 when engaged therewith and to hold the nut 8 so long as screw 9 is not yet inserted. As noted, the head of screw 9 is provided with a bore through the head thereof suitable for the insertion of a sealing device whereby to prevent the unauthorized opening thereof and to indicate the tampering therewith.

Coupled to an enlarged portion of lid 2 is a bolt 10 with the head thereof engaged with the enlarged portion in the lid 2. The shank portion of the bolt 10 is provided with a suitable threaded portion for mounting of the whole apparatus to the instrument panel of the vehicle or other suitable place. A nut 11 is threaded onto the shank portion of the bolt 10 for fixedly engaging bolt 10 with lid 2, and a bearing lock washer may also be used.

A shaft 15 is provided to which is coupled a drum 18 for rotation therewith. Shaft 15 is mounted for rotation at one end thereof in base plate 4 by means of an axial bearing 17 and is mounted for rotation at the other end thereof in the bottom of case 1 by means of a bearing ring 12 which is L-shaped in section and ring 13 which is also L-shaped in section. Rings 12 and 13 fit within a suitable aperture provided in the bottom or base of case 1. Projecting from the bottom end of shaft 15 is a pin 14 which is set within an aperture provided in ring 13, and provided on pin 14 is a ring 93 for a purpose to be hereinafter explained. Axial bearing 17 is provided with shock absorbing material 17' and is fixed to base plate 4 by means of two rivets 16.

Provision is made for the coupling of a flexible shaft which is coupled to the vehicle speedometer or transmission or other suitable part of the vehicle which rotates in proportion to the travel of the vehicle; an end portion 19 is provided which is supported on lid 2 for supporting the outer casing 18' of the flexible shaft.

In order to transmit the motion from the flexible shaft which passes through casing 18' to the drum 18, there is provided a belt drive comprising a pair of aligned pulleys 21 and 22 disposed on opposite sides of shaft 15 between base plate 4 and lid 2 and an idler pulley 32 (Fig. 2). Pulley 22 is rotatably mounted to base plate 4 by means of a cylindrical ring member 25 which is threaded at one end thereof and on its outer surface, the threaded end is engaged by a locking nut 26 for holding ring member 25 stationary relative to base plate 4 in order to form an axle about which pulley 22 rotates. Pulley 22 comprises an outer ring 29 which is secured by means of rivets 28 to a base plate 27, ring 29 being spaced from ring member 25 for rotation relative thereto. Base plate 27 is secured to a center element 23 which rotates within the two self-lubricating bearing ring members 24 which are press-fitted within ring member 25. Coupled to the center element is a pinion 38 for a purpose to be hereinafter explained. Positioned on outer ring 29 is a material formed from several layers of thin fabric such as adhesive tape which is wrapped around the outer ring to provide a given diameter for the pulley. It will be understood that pulley 21 is formed and mounted on the base plate 4 in the same manner as pulley 22.

The flexible shaft has a square end part 20 which is positioned between case lid 2 and base plate 4; this end part reaches into a corresponding square opening of the center element 23 of belt pulley 21, which as noted above is made in the same way and has the same bearing as belt pulley 22.

A flat belt 31 is carried by pulleys 21 and 22, and idler pulley 32 is provided in order to impart the proper tension to the belt 31. A two-armed lever 35 is provided which is pivotally mounted to base plate 4 by means of pivot pin 34. At one end of lever 35, pulley 32 is coupled by means of axle 33 and at the other end a spring 36 is attached, one end of spring 36 being attached to lever 35 and the other end being attached to a stud 37 which is affixed to base plate 4. Pulley 32 has a range of movement determined by a guideway 33' within which axle 33 may move in a well known manner and by means of spring 36 which together with guideway 33' determines the lower extent of the movement of pulley 32. The gear ratio of the belt transmission 21, 22, 31 may be altered by varying the amount of tape 30 contained on either one of the pulleys 21 and 22 so that a predetermined travel of the vehicle will produce exactly one revolution of the drum 18; when installing the apparatus on the vehicle, a length of tape 30 may be unwound from one pulley, severed away and wound onto the other pulley to obtain the required gear ratio.

Fastened to the front end of center part 23 of pulley 22 is the pinion 38 which gears with a pawl-supporting wheel 39 loosely mounted on shaft 15. By means of an axle 40, a pawl 42 is mounted on this wheel; this pawl is loaded by means of spring 41 as shown in Fig. 2. The pawl cooperates with the ratchet wheel 43 and will only move it when wheel 39 is rotated in a counter-clockwise direction as seen in Fig. 2, which corresponds to the forward movement of the vehicle. The ratchet wheel 43 is secured to a gear wheel 46 by means of rivets 45. The gear wheel 46 is loosely mounted for free rotation on the hub of wheel 39 and meshes with a gear 47. The latter is shown in Fig. 1 to be rotatably mounted on a bearing assembly 48, 49 fixed on base plate 4 at the place shown by Fig. 2 and in a manner shown by Fig. 1. The pinion teeth 50 of this gear 47 engage with an inner toothing 51 of drum 18.

Drum 18 on its front end (Fig. 1 bottom end) has an outside flange 18*a* with six notches 52 which are evenly distributed; six sheet metal strips 53 are provided and run parallel with the drum axis and through these six notches. The ends of the strips 53 are bent inwards and the strips 53 serve as wedges in order to impede any relative rotation between drum 18 and the parts supported thereby. The parts supported by drum 18 comprise six sets of two ring disks designated 54 and 55 respectively; in addition, six pairs of metal ring disks 56 are provided on opposite sides of each ring disk set 54, 55, and five intermediate disks 57, as shown in Fig. 1. Each of the ring disks 54 is made by stamping to have four hundred and eighty tongues 58 which project radially outwardly and move with their free ends immediately in front of a forward-turned shoulder of an associated rib 59 of segment 3, providing the tongues 58 are not bent backwards as described subsequently. All tongues 58 which are bent backwards will glide with their free tips over a conical, rearward-turned shoulder of rib 59.

The tongues 58 of the most forward ring disk 54 (that is the lowermost ring disk in Fig. 1) serve to provide a record of the speed of the vehicle for the last 300 meters of travel of this vehicle, in a manner explained later on. In the apparatus submitted, these 300 meters of travel are represented by the circumferential length of the ribs 59. The tongues 58 of each of the five further ring disks serve for similar recording of five other functions. It is to be understood that this figure of 300 meters is arbitrary and may be varied in accordance with the purpose to which the present invention is applied. It is also to be understood that the number of ring disks 54 might be greater or lesser than six.

For each ring disk 54 and its 480 tongues 58 a pilot tongue 60 is provided which is moved back and forth by means of an electromagnetic device 64 to be further explained subsequently. In one of its end positions, the pilot tongue 60 bends all tongues 58 which come into engagement therewith and forces the tongues 58 to glide over the backwards turned shoulder of rib 59, which shoulder retains the tongues 58 bent until the tongues again reach their original position in the lateral opening of segment 3, after having completed the "300 meters." In its other end position, the pilot tongue 60 does not bend the passing tongues 58, and tongues 58 move freely with their tips in front of the aforementioned rib 59.

It is emphasized that tongues 58 of necessity have to consist of a very flexible, resilient and wearproof material, because it frequently happens that pilot tongue 60 is moved at precisely the same moment as one of the tongues 58 reaches the rib 59. The Du Pont de Nemours Company have developed a foil terephthalate which is generally sold under the name of "Mylar"; this material is particularly well suited to serve as the material for the ring disks 54 on which the tongues 58 are integrally formed by stamping. Ring disks 55 are preferably made of the same material as the ring disks 54 and overlie the tongues 58 of the related ring disk 54 over a portion of their length for the purpose of keeping as low as possible the flexion stress of these tongues particularly their root portions. The ring disks 54 with the tongues 58 and the ring disks 55 are substantially 0.004 inch thick.

Figure 7:
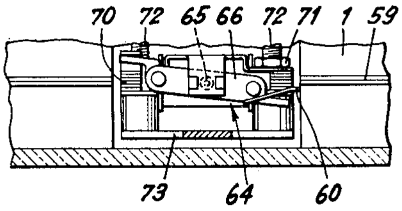
Figure 7 is a partial detail view looking in the direction of the arrow VII in Figure 3.

A hollow sleeve member 62 is positioned on shaft 15 for fixedly supporting at one end base member 61 which supports a switching device 63 for a purpose to be hereinafter explained. Disposed within portion 1*a* of the casing are the six electro-magnets 64. As will be noted from Figures 1 and 7 the pilot tongue 60 on each of the six electro-magnets 64 is fixedly connected for movement with armature 66 which is mounted for movement about a swivel axle 65. As mentioned hereinbefore, each pilot tongue 60 is effective in accordance with the position thereof to bend the tongues 58 of the related ring disk 54 when the armature 66 is in one position and to leave tongues 58 of the same ring disk 54 in their normal condition when armature 66 is in its other position. The position of the tongues 58 determines whether they move above or below their associated rib 59 a in order to provide a record as will be explained hereinafter.

Stators 70 of all six electro-magnets 64 are adjustably secured to a plate 73 by means of four bolts 72, and a pair of nuts 71 are placed onto each of the bolts 72 on each side of the six stators 70 for holding them relative to the base of case 1. Plate 73 is fastened to the base 1 by means of bolt 74 and nut 75 at an intermediate point, and at one end plate 73 is provided with an end portion 73*a* having prongs for engagement with the side of case 1 for securely holding plate 73 relative to case 1. The other end 73*b* of plate 73 is forked for engagement with a plug 76 which is affixed to base plate 61 so as to retain plate 61 together with sleeve 62 against rotation. It is also to be noted that a lamp 78 is provided for illumination and is coupled to a holder 77 attached to base plate 61. Lamp 78 is provided so that its light will be reflected from the bottom of case 1 in an oblique direction onto tongues 58 and will be differently reflected by them depending on whether or not they are bent. When the tongues are made of a colored material, the tongues which are bent will appear to a viewer as being of a different shade than the unbent ones.

Figure 5:
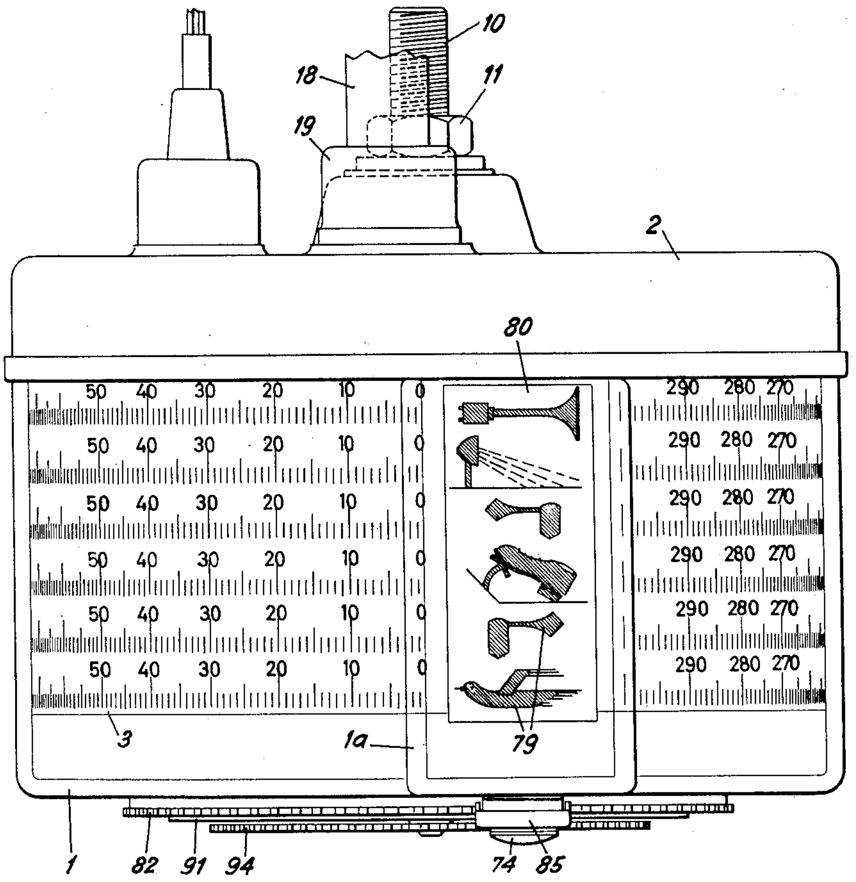
Figure 5 is a left-side view of the apparatus as shown in Figure 1.

As noted, there are six sets of tongues 58 (as many sets as there are ring disks 54) and the other associated elements as hereinbefore described, such as pilot tongues 60 and electro-magnets 64; the operation of each set is the same, but they may be used to provide different indications or records, as required. It will be understood that it is not necessary to limit the invention to six records, since more or less may be used in accordance with the number of records to be made. From Figure 5 of the drawings, it will be noted that various signs or indicia 79 are printed on a suitable shield 80 which is disposed on a side of case 1. It is also to be noted that the tongues of the last or sixth disk 54 from the bottom of case 1 or the first set of tongues 58 from the top indicate the period (expressed in meters of travel) during which the horn has been blown. Another indication or record is used to indicate the dimming of the head lamps, a left-turn indication, a right-turn indication, a brake pedal indication and, as described later on, a speed indication. All of these indications are only provided for the last 300 meters of movement of the vehicle, and they are useful so as to provide a record of the various indications to the police or other authorities in order that there will be an exact record of the driver's reactions during the last 300 meters of movement of the vehicle. Apparatus of this nature can be of great importance and utility, if the vehicle is involved in an accident. The apparatus is so constructed that anyone can read the indications and yet is tamper-proof so as to prevent any falsifications of the record.

It is obvious that on installing the apparatus on the vehicle, the windings of the electro-magnets 64 used for recording the above recited functions (blowing of horn, . . .), excepted that used for speed recording, must be connected to the corresponding electrical circuit component. The electro-magnet 64 used for recording the actuation of the brake pedal may adequately be connected to circuit of the stop light.

Figure 3:
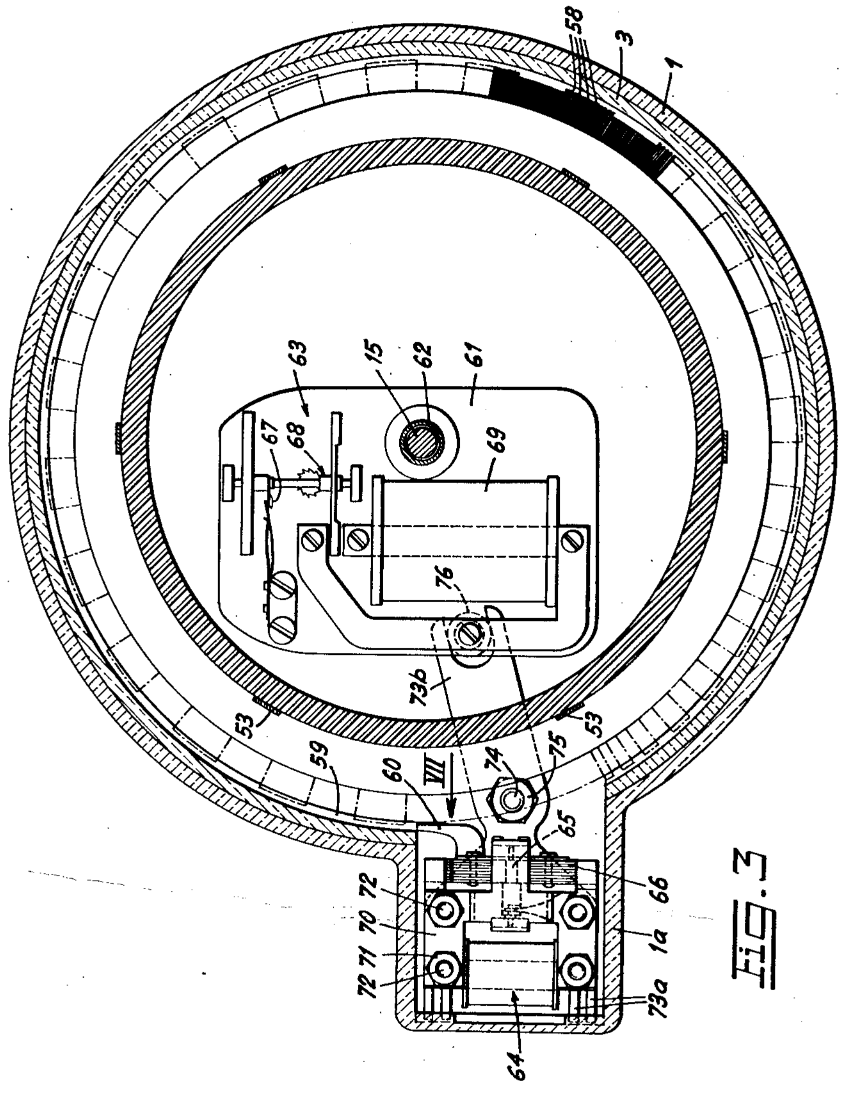
Figure 3 is a sectional view taken along line III—III of Figure 1.
Figure 4:
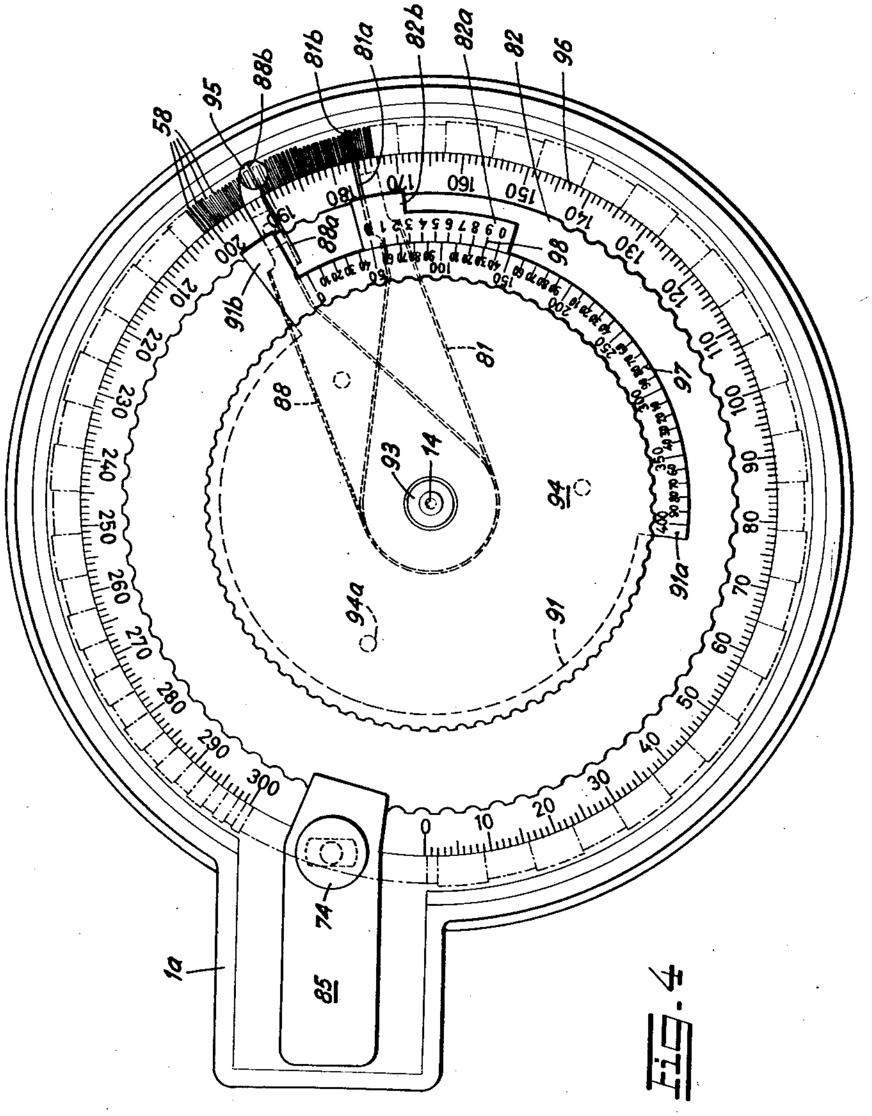
Figure 4 is a bottom plan view of the apparatus as shown in Figure 1.

It has been said in the preceding paragraph that the ring disk 54 located nearest to the bottom of case 1 is used for recording of speed. It will be understood that this purpose can be achieved in a very simple manner if the armature of the corresponding electro-magnet 64 is moved back and forth in regular short intervals, since the drum 18 rotates in proportion with the travel of the vehicle. The greater the travelling speed, the greater will be the number of tongues 58 which are bent, and respectively not bent, during a half cycle of the alternating motion of the pilot tongue 60 carried by the armature 66 of this electro-magnet. The travelling speed of the vehicle results in the number of tongues 58 contained in a group, with even duration of each half cycle. In our example the duration of each half cycle is one half second. With a speed of fifty kilometers per hour, eleven successive tongues are regularly bent, while the following eleven tongues are not bent. Reference may be had to Figs. 3 and 4 which illustrate this characteristic effect.

It is obvious that any appropriated device may be used to energize that foremost electro-magnet 64 used for recording of speed. In the embodiment shown, the device used for that purpose is the switching device 63. Since the construction of this switching device 63 is well known it will be sufficient to note that it comprises a rotor 68 carrying a movable contact element 67 and providing together with a spiral spring (not shown) and an electro-magnet 69 for a rotary oscillating system. When installing the apparatus on the vehicle, a pair of conductors (not shown) will be used to connect this switching device to the electric system of the vehicle so that it will operate so long as the dashboard key is inserted.

The automatic cancellation of all records occurs continually and automatically so long as drum 18 is rotated, in other words so long as the vehicle moves forwardly; it consists in that all backwardly bent tongues 58 of the several ring disks 54 get straight, owing to their own elasticity, as soon as they reach the end of the corresponding ribs 59.

The reading of the speed record (provided by the tongues 58 of the foremost disk 54) is rendered more easy by the device now to be described.

A hand 81 is fixed to the flange or base of the L-shaped ring 12. A metal disk 82 is fixed to the leg of the same ring 12 and positioned in front of the case bottom. It is flexible because it has recesses 83, which extend partly in the direction of the circumferential extent and partly in the radial extent. This disk 82 lies with its extreme edge on a projecting part of case bottom and is under the control of a brake device. Forming part of this brake device is a brake lining plate 84, which is glued to the short arm of lever 85, which in turn is disposed under the flat head of screw 74 and held against the base of casing 1. Between case bottom and the lever's long arm, a leaf spring 86 is provided, and by means of pressure onto its long arm, the lever is tilted in the eye 1*b* of the bottom, which is possible because of play 87. The small plate 84 is thus lifted from disk 82, and disk 82 can now be turned easily by hand, moving at the same time hand 81 by means of its coupling to ring 12.

Another hand 88 is fixed to the ring 13. Ring 13 in its front part is provided with central hole 90 and three longitudinal slits 89 angularly spaced from each other 120°. A spring disk 91 is set on the remaining segments 13*a*, which because of the recesses 92, generally similar to recesses 83, is flexible. A retaining ring 93 is fixed to the end portion of pin 14 and spreads the segments 13*a* provided at the end of L-shaped bearing ring 13 as a result of the conical surface of ring 93 and therefore presses against the central opening provided in spring disk 91. On top of and spaced from spring disk 91, there is provided a turntable 94 provided with three rivets 94*a* by means of which it is secured to the spring disk 91.

When turntable 94 is turned, hand 88 is moved by means of spring disk 91 and ring 13; it will be noted that hand 88 is fixedly coupled to ring 13 which is also fixedly coupled to spring disk 91. Both hands 81 and 88 are made of sheet metal and have their ends bent lengthwise at 81*a* and 88*a*, respectively, and terminate in ends **81*b* and 88*b* which ends are relatively thin and terminate beneath the tongues 58 used for recording the speed of the vehicle. A magnifying lens 95 is carried by hand 88 and is disposed immediately behind the bottom of case 1 and aligned with the tongues 58 and ends 81*b*, 88*b***.

At the bottom of case 1, there is provided a ring scale 96 which may be suitably engraved on case 1 or otherwise provided thereon. Ring scale 96 illustrates, for example, the 300 meters or other suitable calibration and appears, when looked at from the front, between the notched edge of metal plate 82 and the circular row of tongues 58 (Figure 4). Spring disk 91 is provided with a portion **91*a* which extends beyond the peripheral extent of turntable 94, and this portion 91*a* is provided with a speed scale reading from zero (0) to 400 kilometers per hour. Metal disk 82 is provided with a forwardly pressed portion 82*a* and provided thereon is a vernier scale 98 which cooperates with scale 97. Portions 82*a* and 91*a* are on the same level, with portion 82*a* being provided with an extension 82*b* and portion 91*a* being provided with an extension 91*b*. These extensions may abut against the lever 85 in order to limit the manual rotation of plate 82, spring disk 91 and turntable 94 whereby to prevent hands 81 and 88 from knocking against plate 73**.

Reading the speed recorded at any part of scale 96, turntable 94 is first turned until part **91*b* approaches part 82*b*. Consequently, hand 88*b* together with magnifying glass 95 approaches hand 81*b*. By pressing lever 85, the braking effect on disk 82 is loosened and disk 82 may now be turned together with disk 91 and turntable 94 until the points of the hands lie within the range in question, i.e. over the slit between a bent tongue 58 and an unbent tongue. In the example this slit occurs to be located at the 177th of the last 300 meters driven. Reading is facilitated by means of the magnifying glass 95. Hand 81 is now set, lever 85 should be released in order that disk 82 and hand 81 are again blocked. By turning turntable 94, hand 88 which carries the magnifying glass 95 can now be moved until a group of bent and unbent tongues 58 lie between both hand points 81*b* and 88*b*, as illustrated in Fig. 4. The magnifying glass 95 again is helpful inasmuch as it facilitates the correct setting of hand 88. The speed can now be read on scale 97 with or without the help of vernier scale 98**, namely "50 kilometers/hour" in the example shown herein.

If speed has considerably varied within the range in question, which is shown by a clear difference of the lengths of consecutive groups of tongues 58 the hands can be set to show the width of one group only instead of two. In this case, the results shown on scale 97 must be doubled.

While there has been described what is at present considered to be the preferred embodiment of this invention, it will be obvious to those skilled in the art that various changes and modifications may be made therein without departing from the scope of the invention.

It should be noted that the recording apparatus of the invention is not only intended for use on vehicles, but may serve in quite different fields. The drum 18 or equivalent member fitted with one or several circular rows of tongues 58 might be moved for example at constant speed e.g., by clock movement and the pilot tongue 60 related with each row of tongues 58 might be moved back and forth in any appropriate way in dependence of some function to be recorded temporarily (e.g. operation or rest of a machine).

What I claim is:

1. A recording apparatus with automatic cancelling, comprising a casing, a rotating member mounted within said casing, a plurality of ring discs secured to the circumferential surface of said rotating member and axially spaced from each other, each of said ring discs having a plurality of resiliently flexible tongues provided on the peripheral edge thereof, a stationary member provided on the interior surface of said casing and radially spaced from the peripheral edges of said flexible tongues, a plurality of circumferential ribs integrally provided on said stationary member and each having a circumferential interruption provided therein, so that each of said ribs extends along the path of said flexible tongues of a radially adjacent ring disc, a plurality of controlled members each pivotally mounted within said casing in the approximate vicinity of said circumferential interruption, so that each controlled member co-operates with said flexible tongues of an adjacent ring disc, each of said controlled members being selectively movable between a first and a second end position, so that in said first end position each of said controlled members contacts said flexible tongues of said adjacent ring disc to deflect them as they pass said circumferential interruption to cause them to slide over one of said circumferential ribs until they again reach said circumferential interruption, and each of said controlled members in said second end position by-passing said flexible tongues of said adjacent ring disc when they travel past said circumferential interruption to permit them to move along beneath one of said circumferential ribs.

2. A recording apparatus according to claim 1, characterized in that each of said ring discs is composed of resilient plastic material being less than $\frac{1}{10}$ mm. thick, said rotating member having a plurality of pairs of circumferential ring portions mounted thereon, each pair of circumferential ring portions securing one of said plurality of ring discs to said rotating member.

3. A recording apparatus according to claim 2, characterized in that each of said ring discs is clamped between one of said pair of circumferential ring portions, a second ring disc provided juxtaposed to each of said ring discs on that side toward which said tongues are deflected and extending radially over a part of the length of said tongues to reduce their root bending stress.

4. A recording apparatus according to claim 3, in which each of said ring discs and juxtaposed second ring disc are made of polyterephthalate foil.

5. A recording apparatus according to claim 1, adapted for use on a vehicle, characterized in that said rotating member is operatively coupled to a tachometer shaft and actuated as a function thereof, so that movement of said rotating member is proportional to the travel of the vehicle, and means operatively coupled to one of said plurality of controlled members to actuate it between said first and second end position in a predetermined period of time a plurality of actuating means each operatively coupled to one of the other controlled members and each adapted to be connected to exterior vehicle indicating means.

6. A recording apparatus according to claim 5, characterized in that said means and each of said plurality of actuating means comprises an electromagnet provided with a pivotally mounted armature, each of said plurality of controlled members fixed to one of said armatures for actuation thereby, an electrically driven switching device mounted within said casing and connected to the winding of said electromagnet of said means to energize it, and said electromagnet of each of said plurality of actuating means connected to an external vehicle circuit.

7. A recording apparatus according to claim 1, characterized in said casing having a transparent front wall, a ring scale provided on said front wall indicating a travel distance and the ends thereof corresponding to those of each of said plurality of circumferential ribs, a number of manually actuated reading discs positioned ahead of said front wall and rotatably mounted thereon independently of one another about an axis coinciding with the axis of rotation of said rotating member, one of said reading discs provided with a miles per hour scale and the other provided with a vernier scale, a number of hands rotatably mounted within said casing and connected to one or the other of said reading discs, and each of said hands having free ends positioned directly in front of said flexible tongues.

8. A recording apparatus according to claim 7, characterized in that one of said hands is provided with a magnifying glass radially extending from the end thereof.

9. A recording apparatus according to claim 6, characterized in that the winding of one of said plurality of electromagnets is electrically connected in parallel to the horn circuit of the vehicle, another winding to the headlamp dimming circuit, another winding to the direction indicator circuit, and another winding to the stop light circuit.

10. A recording apparatus with automatic cancelling, comprising a casing, a rotating member mounted within said casing, a ring disc secured to the circumferential surface of said rotating member and having a plurality of resiliently flexible tongues provided on the peripheral edge, a stationary member provided on the interior surface of said casing and radially spaced from the peripheral edges of said flexible tongues, a circumferential rib integrally provided on said stationary member and having a circumferential interruption provided thereon, whereby said rib extends along the path of said flexible tongues, a controlled member pivotally mounted within said casing in the approximate vicinity of said circumferential interruption, so that said controlled member co-operates with said flexible tongues, actuating means coupled to said controlled member for selective movement thereof between a first and a second end position, so that in said first end position said controlled member contacts said flexible tongues to deflect them as they pass said circumferential interruption causing them to slide over said circumferential rib until they again reach said circumferential interruption, and said controlled member in said second end position by-passing said flexible tongues when they travel past said circumferential interruption to permit them to move along beneath said circumferential rib.

11. A recording apparatus according to claim 10, characterized in that said ring disc is composed of resilient plastic material being less than 1/10 mm. thick, said rotating member having a pair of circumferential ring portions mounted thereon securing said ring disc thereto.

12. A recording apparatus according to claim 11, characterized in that said ring disc is clamped between said pair of circumferential ring portions, a second ring disc juxtaposed to said ring disc on that side toward which said tongues are deflected and extending radially over a part of the length of said tongues to reduce their root bending stress.

13. A recording apparatus according to claim 12, in which said ring disc and juxtaposed second ring disc are composed of polyterephthalate foil.

14. A recording apparatus according to claim 10, adapted for use on a vehicle, characterized in that said rotating member is operatively coupled to a tachometer shaft and actuated as a function thereof, so that movement of said rotating member is proportional to the travel of the vehicle, and said actuating means adapted to be connected to an exterior vehicle indicating means.

15. A recording apparatus according to claim 14, characterized in that said actuating means comprises an electromagnet having a pivotally mounted armature, said controlled member fixed to said armature for actuation thereby, an electrically driven switching device mounted within said casing and connected to the winding of said electromagnet to energize it.

16. A recording apparatus according to claim 10, characterized in said casing having a transparent front wall, a ring scale provided on said front wall and the ends thereof corresponding to those of said circumferential rib, a number of manually actuated reading discs positioned ahead of said front wall and rotatably mounted thereon independently of one another about an axis coinciding with the axis of rotation of said rotating member, one of said reading discs provided with a miles per hour scale and the other provided with a vernier scale, a number of hands rotatably mounted within said casing and connected to one or the other of said reading discs, and each of said hands having free ends positioned directly in front of said flexible tongues.

17. A recording apparatus according to claim 1, characterized in that said rotating member is adapted to be coupled to an exterior shaft for actuation therethrough, a plurality of electromagnets each having a pivotally mounted armature, each of said plurality of controlled members fixed to one of said armatures for actuation thereby.

References Cited in the file of this patent

UNITED STATES PATENTS 897,715 Cowey ---------------- Sept. 1, 1908
2,326,247 Nicholides ------------ Aug. 10, 1943